United States Patent
Burroughs et al.

(10) Patent No.: US 8,626,926 B2
(45) Date of Patent: Jan. 7, 2014

(54) METHOD AND APPARATUS FOR PERFORMING SESSION INFO QUERY FOR USER PLANE LOCATION

(75) Inventors: Kirk Allan Burroughs, Alamo, CA (US); Stephen W. Edge, Escondido, CA (US); Ie-Hong Lin, Fremont, CA (US); Andreas K. Wachter, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 483 days.

(21) Appl. No.: 12/263,225

(22) Filed: Oct. 31, 2008

(65) Prior Publication Data
US 2009/0216846 A1    Aug. 27, 2009

Related U.S. Application Data

(60) Provisional application No. 61/031,622, filed on Feb. 26, 2008.

(51) Int. Cl.
*G06F 15/16*    (2006.01)
(52) U.S. Cl.
USPC ......... 709/227; 455/420; 455/418; 455/456.1
(58) Field of Classification Search
USPC ......... 709/201–203, 223–229, 200, 249–250; 455/414.2, 421, 440; 370/236, 370/260–270; 701/207, 213; 726/1–4, 11, 726/8, 22, 26–27
See application file for complete search history.

(56) References Cited

U.S. PATENT DOCUMENTS

| | | | | |
|---|---|---|---|---|
| 8,086,247 | B2 * | 12/2011 | Kraufvelin et al. | 455/456.1 |
| 8,122,090 | B2 * | 2/2012 | Thomas et al. | 709/206 |

(Continued)

FOREIGN PATENT DOCUMENTS

| | | |
|---|---|---|
| CN | 1859797 A | 11/2006 |
| CN | 101014182 A | 8/2007 |

(Continued)

OTHER PUBLICATIONS

"UserPlane Location Protocol, Draft Version 2.0" Open Mobile Alliance Ltd., Feb. 1, 2008, XP002524884, Retrieved from the Internet: URL:http://member.openmobilealliance.org/ftp/Public_documents/LOC/2008/OMA-LOC-2008-0032-INP_SUPL_2.0_TS_ULP_update.zip [retrieved on May 23, 2011], pp. 1-329.

(Continued)

*Primary Examiner* — Greg C Bengzon
(74) *Attorney, Agent, or Firm* — Arnold J. Gum

(57) ABSTRACT

Techniques for querying for information on location sessions in a user plane location architecture are described. In an aspect, a location server may send a query message to a terminal to query for information on active location sessions, e.g., when at least one location session for periodic triggered service or area event triggered service is deemed to be active. The terminal may return a response message containing a list of session identifiers (IDs) for the active location sessions, parameters for the active location sessions, capabilities of the terminal, etc. The location server may compare the information received from the terminal and information stored at the location server. The location server may terminate each location session deemed to be active at only the terminal or only the location server. The location server may restart or terminate each location session having inconsistent parameters at the terminal and the location server.

41 Claims, 8 Drawing Sheets

(56) References Cited

U.S. PATENT DOCUMENTS

| | | | |
|---|---|---|---|
| 8,521,187 B2* | 8/2013 | Hefner et al. | 455/456.3 |
| 2003/0061319 A1 | 3/2003 | Manzardo | |
| 2006/0258371 A1* | 11/2006 | Krishnamurthi et al. | 455/456.1 |
| 2007/0082682 A1* | 4/2007 | Kim et al. | 455/456.1 |
| 2007/0149213 A1* | 6/2007 | Lamba et al. | 455/456.1 |
| 2007/0155400 A1* | 7/2007 | Madsen | 455/456.1 |
| 2007/0182547 A1* | 8/2007 | Wachter et al. | 340/539.13 |
| 2008/0113671 A1* | 5/2008 | Ghozati et al. | 455/456.1 |
| 2009/0036142 A1* | 2/2009 | Yan | 455/456.1 |
| 2009/0083430 A1* | 3/2009 | Edge et al. | 709/228 |
| 2009/0132579 A1* | 5/2009 | Kwang | 707/102 |
| 2009/0181698 A1* | 7/2009 | Farmer et al. | 455/456.3 |
| 2010/0062752 A1* | 3/2010 | Shim | 455/418 |
| 2010/0217879 A1* | 8/2010 | Weiner | 709/228 |
| 2010/0228845 A1* | 9/2010 | Choi | 709/223 |

FOREIGN PATENT DOCUMENTS

| | | | |
|---|---|---|---|
| CN | 101087482 A | | 12/2007 |
| CN | 101120522 A | | 2/2008 |
| JP | 2001521350 A | | 11/2001 |
| JP | 2002512394 A | | 4/2002 |
| JP | 2007124594 A | | 5/2007 |
| JP | 2008546343 A | | 12/2008 |
| RU | 2005130765 | | 5/2006 |
| WO | 9954803 A2 | | 10/1999 |
| WO | 0237267 | | 5/2002 |
| WO | 2004080096 | | 9/2004 |
| WO | 2007086702 A1 | | 8/2007 |

OTHER PUBLICATIONS

International Search Report, PCT/US2009/034786, International Search Authority, European Patent Office, Jun. 2, 2009.
Written Opinion, PCT/US2009/034786, International Search Authority, European Patent Office, Jun. 2, 2009.
International Preliminary Examination Report, PCT/US2009/034786, International Search Authority, European Patent Office, Aug. 31, 2010.
Taiwan Search Report—TW098106232—TIPO—Apr. 24, 2012.
Taiwan Search Report—TW098106232—TIPO—Dec. 11, 2012.

* cited by examiner

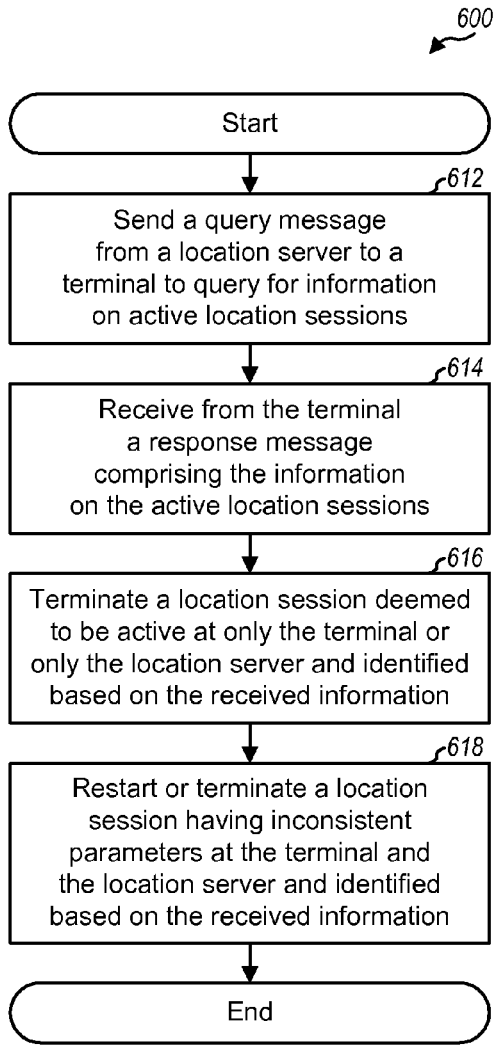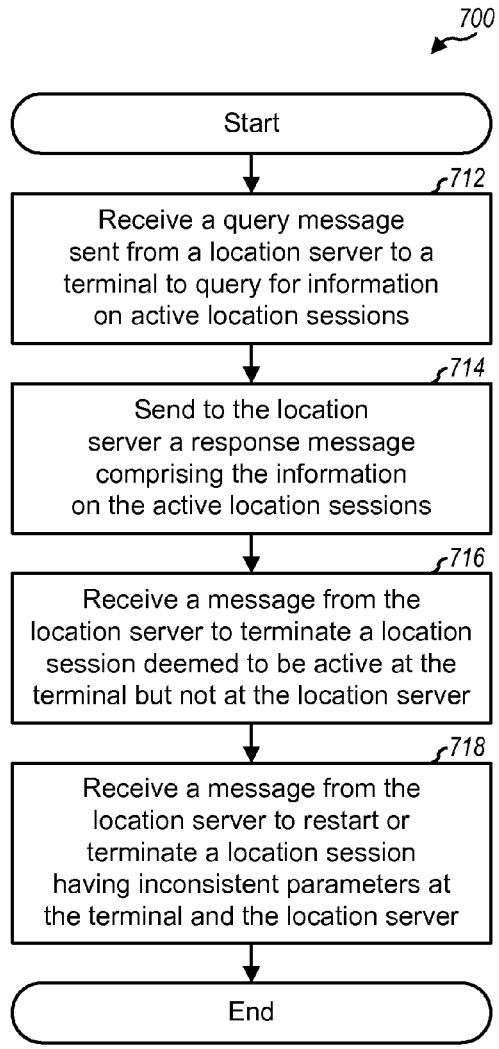
FIG. 6
FIG. 7

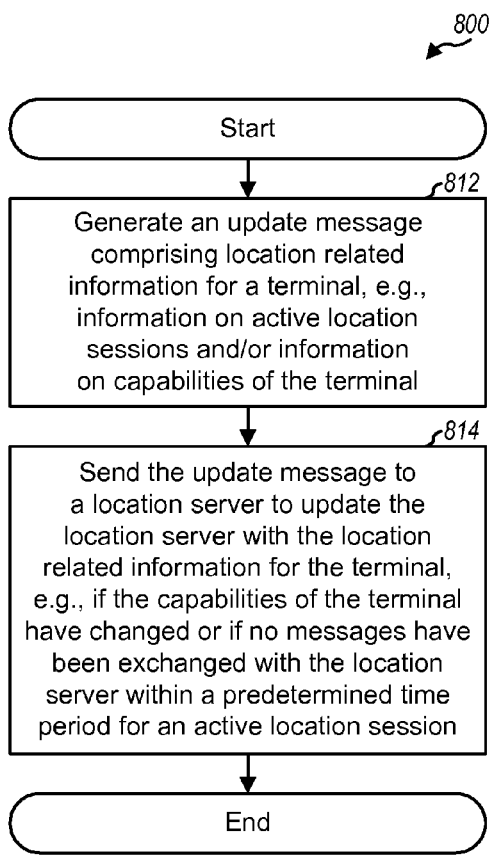
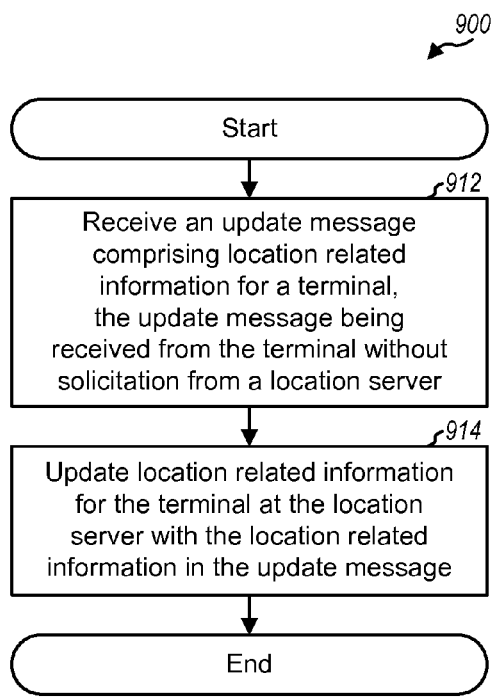
FIG. 8
FIG. 9

METHOD AND APPARATUS FOR PERFORMING SESSION INFO QUERY FOR USER PLANE LOCATION

CLAIM OF PRIORITY UNDER 35 U.S.C. §119

The present Application for Patent claims priority to Provisional U.S. Application Ser. No. 61/031,622, entitled "SESSION AUDITING FOR SECURE USER PLANE LOCATION (SUPL)," filed Feb. 26, 2008, assigned to the assignee hereof, and expressly incorporated herein by reference.

BACKGROUND

I. Field

The present disclosure relates generally to communication, and more specifically to techniques for supporting location services.

II. Background

It is often desirable, and sometimes necessary, to know the location of a terminal. The terms "location" and "position" are synonymous and are used interchangeably herein. For example, a user may utilize the terminal to browse through a website and may click on location sensitive content. The location of the terminal may then be determined and used to provide appropriate content to the user. As another example, the user may place an emergency call using the terminal. The location of the terminal may then be determined and used to send emergency assistance to the user. There are many other scenarios in which knowledge of the location of the terminal is useful or necessary.

A terminal may exchange messages with a location server to establish a location session for a location service. If the session establishment is successful, then the terminal may communicate with the location server for the location service. The duration of the location session may be dependent on the type of location service being obtained and possibly other factors. It may be desirable to maintain the location session as long as it is valid at both the terminal and the location server and to terminate the location session otherwise.

SUMMARY

Techniques for querying for information on location sessions in a user plane location architecture such as Secure User Plane Location (SUPL) are described herein. In an aspect, a location server may perform a query for session information (or a session info query) to request a terminal to return information regarding all active location sessions that are currently in progress between the terminal and the location server. The session info query may be used to identify (i) location sessions that are active at only the location server or only the terminal and/or (ii) location sessions in which parameters at the location server are inconsistent with parameters at the terminal. The location server may perform the session info query periodically and/or whenever it suspects possible inconsistent session context between the location server and the terminal. The inconsistent session context may result from an accidental power down of the terminal, a failure at the terminal or the location server, a prolonged inability to communicate between the terminal and location server, etc. The techniques may be used to detect and address inconsistent session context and may improve location service and performance.

In one design, a location server may send a query message to a terminal to query for information on active location sessions, e.g., when at least one location session for periodic triggered service or area event triggered service is active in the location server. The terminal may return a response message comprising the information on the active location sessions. This information may include a list of session identifiers (IDs) for the active location sessions, parameters for the active location sessions, etc. The terminal may also return its capabilities and/or other information to the location server. The location server may compare the information received from the terminal and information stored at the location server. The location server may terminate each location session deemed to be active at only the terminal or only the location server. The location server may restart or terminate each location session in which parameters at the terminal are inconsistent with parameters at the location server. The location server may also perform other corrective actions if the received information does not match the stored information.

In another aspect, a terminal may send an update message to a location server to provide the location server with information on active location sessions and/or information on capabilities of the terminal. In one design, the terminal may send the update message if no messages have been exchanged with the location server for an active location session within a predetermined time period. In another design, the terminal may send the update message if the capabilities of the terminal have changed since last reported to the location server.

Various aspects and features of the disclosure are described in further detail below.

BRIEF DESCRIPTION OF THE DRAWINGS

FIG. 6 shows a process for supporting location services by a location server.

FIGS. 7 and 8 show two processes for supporting location services by a terminal.

FIG. 9 shows another process for supporting location services by the location server.

DETAILED DESCRIPTION

Techniques for performing session info query in user plane location architectures/solutions are described herein. A user plane location architecture is a location architecture that sends messages for location services via a user plane. User plane location architectures are different from control plane location architectures, which send messages for location services via a control plane. A user plane is a mechanism for carrying signaling for higher-layer applications and employing a user-plane bearer, which is typically implemented with protocols such as User Datagram Protocol (UDP), Transmission Control Protocol (TCP), and Internet Protocol (IP). A control plane is a mechanism for carrying signaling for higher-layer applications and is typically implemented with network-specific protocols, interfaces, and signaling messages. Messages supporting location services are carried as part of signaling in a control plane architecture and as part of data (from a network perspective) in a user plane architecture.

The content of the messages may, however, be the same or similar in both user plane and control plane location architectures.

The techniques described herein may be used for various user plane location architectures such as SUPL from Open Mobile Alliance (OMA) and X.S0024 from an organization named "3rd Generation Partnership Project 2" (3GPP2). For clarity, certain aspects of the techniques are described below for SUPL, and SUPL terminology is used in much of the description below.

Figure 1:
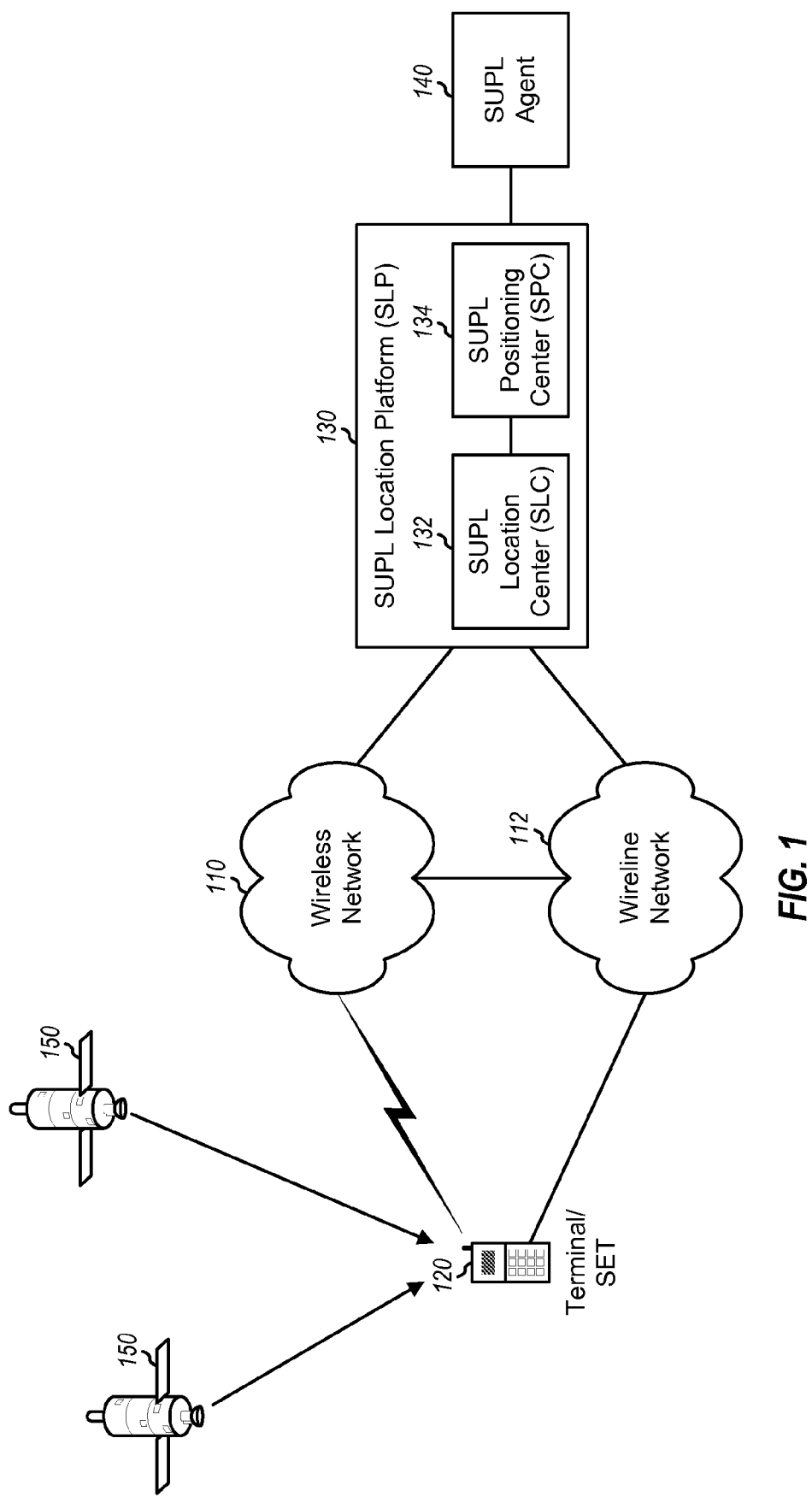
FIG. 1 shows an example deployment supporting location services.

FIG. 1 shows an example deployment supporting location services. A terminal 120 may communicate with a wireless network 110 and/or a wireline network 112 at any given moment to obtain communication services. Terminal 120 may be stationary or mobile and may also be referred to as a mobile station (MS), a user equipment (UE), an access terminal (AT), a subscriber station, a station, etc. Terminal 120 may be a cellular phone, a personal digital assistant (PDA), a handheld device, a wireless device, a laptop computer, a wireless modem, a cordless phone, a telemetry device, a tracking device, etc. Terminal 120 may be referred to as a SUPL Enabled Terminal (SET) in SUPL. The terms "terminal" and "SET" are used interchangeably herein.

Wireless network 110 may be a wireless wide area network (WWAN), a wireless metropolitan area network (WMAN), a wireless local area network (WLAN), etc. The terms "network" and "system" are often used interchangeably. A WWAN may be a Code Division Multiple Access (CDMA) network, a Time Division Multiple Access (TDMA) network, a Frequency Division Multiple Access (FDMA) network, an Orthogonal FDMA (OFDMA) network, a Single-Carrier FDMA (SC-FDMA) network, etc. A CDMA network may implement a radio technology such as Wideband CDMA (WCDMA), cdma2000, etc. cdma2000 covers IS-2000, IS-95, and IS-856 standards. A TDMA network may implement a radio technology such as Global System for Mobile Communications (GSM). An OFDMA network may implement a radio technology such as Long Term Evolution (LTE), Ultra Mobile Broadband (UMB), Flash-OFDM©, etc. WCDMA, GSM and LTE are described in documents from an organization named "3rd Generation Partnership Project" (3GPP). CDMA and UMB are described in documents from 3GPP2. 3GPP and 3GPP2 documents are publicly available. A WMAN may implement a radio technology such as IEEE 802.16, which is commonly referred to as WiMAX. A WLAN may implement a radio technology such as 802.11 (which is commonly referred to as Wi-Fi), Hiperlan, etc. Wireline network 112 may be a cable network, a digital subscriber line (DSL) network, the Internet, etc. Wireless network 110 may or may not be coupled to wireline network 112.

SET 120 may receive and measure signals from satellites 150 to obtain pseudo-range measurements for the satellites. Satellites 150 may be part of the United States Global Positioning System (GPS), the European Galileo system, the Russian GLONASS system, or some other satellite positioning system (SPS) or global navigation satellite system (GNSS). The pseudo-range measurements and the known locations of satellites 150 may be used to derive a position estimate for SET 120. A position estimate may also be referred to as a location estimate, a position fix, etc. SET 120 may also receive and measure signals from base stations within wireless network 110 to obtain timing and/or signal strength measurements for the base stations. The timing and/or signal strength measurements and the known locations of the base stations may be used to derive a position estimate for SET 120. In general, a position estimate may be derived based on measurements for satellites and/or base stations and using one or a combination of positioning methods.

A SUPL Location Platform (SLP) 130 may communicate with SET 120 to support location services for SET 120. Location services may include any services based on or related to location information. Location services may include positioning, which is a process to determine a geographic or civil position estimate for a SET. Positioning may provide (i) latitude, longitude and altitude coordinates and an uncertainty for a geographic position estimate or (ii) a street address for a civil position estimate. The communication between SLP 130 and SET 120 may be via wireless network 110 and/or wireline network 112. SLP 130 may be separate from networks 110 and 112 or may be part of network 110 or 112. SLP 130 may be a Home SLP (H-SLP) with which SET 120 has a service subscription, a Visited SLP (V-SLP) currently serving SET 120, or an Emergency SLP (E-SLP) serving SET 120 for emergency services.

SLP 130 may include a SUPL Location Center (SLC) 132 and a SUPL Positioning Center (SPC) 134. SLC 132 may support location services, coordinate the operation of SUPL, and interact with SETs over user plane bearer. SLC 132 may perform functions for privacy, initiation, security, roaming support, charging/billing, service management, location calculation, etc. SPC 134 may support positioning for SETs and delivery of assistance data to the SETs and may also be responsible for messages and procedures used for location calculation. SPC 134 may perform functions for security, assistance data delivery, reference retrieval, location calculation, etc.

A SUPL agent 140 may communicate (e.g., directly or via one or more networks) with SLP 130 to obtain location information for SET 120. A SUPL agent is a service access point or a location client that accesses network resources to obtain location information. Location information may comprise a position estimate and/or any information related to location. SET 120 may also have a SUPL agent that is resident within the SET. SET 120, SLP 130, and SUPL agent 140 may each support any SUPL version. SUPL Version 2.0 (SUPL 2.0) is described in OMA-AD-SUPL-V2, entitled "Secure User Plane Location Architecture," and in OMA-TS-ULP-V2, entitled "UserPlane Location Protocol." These SUPL documents are publicly available from OMA.

SET 120 and SLP 130 may support various location services. Table 1 lists some location services that may be supported by SET 120 and SLP 130 and provides a short description of each location service. Emergency service may be based on immediate service or some other location service. SET 120 and SLP 130 may also support other location services not listed in Table 1.

TABLE 1

| Location Service | Description |
| --- | --- |
| Immediate | Location of a SET is immediately determined and provided to a SUPL agent. |
| Periodic trigger | Location of a SET is periodically determined and provided to a SUPL agent. |
| Area event trigger | Location of a SET is provided to a SUPL agent when triggered by an area event, e.g., when the SET is inside or outside a target area or enters or leaves the target area. |

SET 120 may establish a location session with SLP 130 for a location service. A location session is a session for location service and may also be referred to as a SUPL session. The location session may be assigned a unique session ID, which may be used by both SET 120 and SLP 130 to identify the location session. The location session may persist for an extended period of time, e.g., a few hours, days, or even weeks. The location session may be for (i) periodic triggered service in which SET 120 periodically obtains and reports its location to SLP 130 or (ii) area event triggered service in which SET 120 reports its location to SLP 130 when certain criteria occur, such as SET 120 entering or leaving a defined geographic area. For location reporting based on entering or leaving a geographic area (or based on any other defined but unpredictable event), SLP 130 may receive location information from SET 120 at unpredictable times, if at all. In addition, if communication can be lost temporarily between SET 120 and SLP 130, then SLP 130 may receive location information from SET 120 at unpredictable times, if at all, for both periodic and triggered location services.

During a location session, SET 120 may somehow lose information regarding the location session, e.g., due to accidental powering off by a user, or due to an inability by SET 120 to communicate with SLP 130. SLP 130 may not become aware of this, possibly for a long time, due to an expectation by SLP 130 of possible long delay between each SET communication. The long delay may be caused by a long time interval between reporting events for periodic triggered service, non-occurrence of reporting criteria for area event triggered service, lack of communication access (e.g., lack of radio coverage) for SET 120, etc. In any case, the loss of session information by SET 120 may lead to improper support of a triggered service since location information for SET 120 will no longer be provided to SLP 130 (or to a requesting SUPL agent) when a periodic trigger or an area event trigger actually occurs.

SLP 130 may also lose information regarding location sessions that are currently in progress at SLP 130, e.g., due a hardware or software failure, a restart procedure, scheduled maintenance, a system upgrade etc. In any case, session context between SLP 130 and SET 120 may be inconsistent. SLP 130 may consider a particular location session to be active while SET 120 may not, or vice versa.

In an aspect, SLP 130 may perform session info query when a location session of an extended duration may still be in progress with SET 120. For the session info query, SLP 130 may request SET 120 to return information regarding all active location sessions between SET 120 and SLP 130 known to SET 120. An active location session is a location session that is deemed to be in progress or active by at least one entity, e.g., an SLP and/or a SET. An active location session may also be referred to as an active SUPL session, a pending location session, etc. SLP 130 may compare the information received from SET 120 with information stored at SLP 130 and may be able to determine whether SLP 130 and SET 120 are in synchronization regarding the active location sessions.

In general, SET 120 may have any number of active location sessions with SLP 130 at any given moment. The active location sessions may be for one or more types of location services. For example, SET 120 may have zero or more periodic triggered session, zero or more area event triggered sessions, etc. A periodic triggered session is a location session for periodic triggered service, and an area event triggered session is a location session for area event triggered service.

Figure 2:
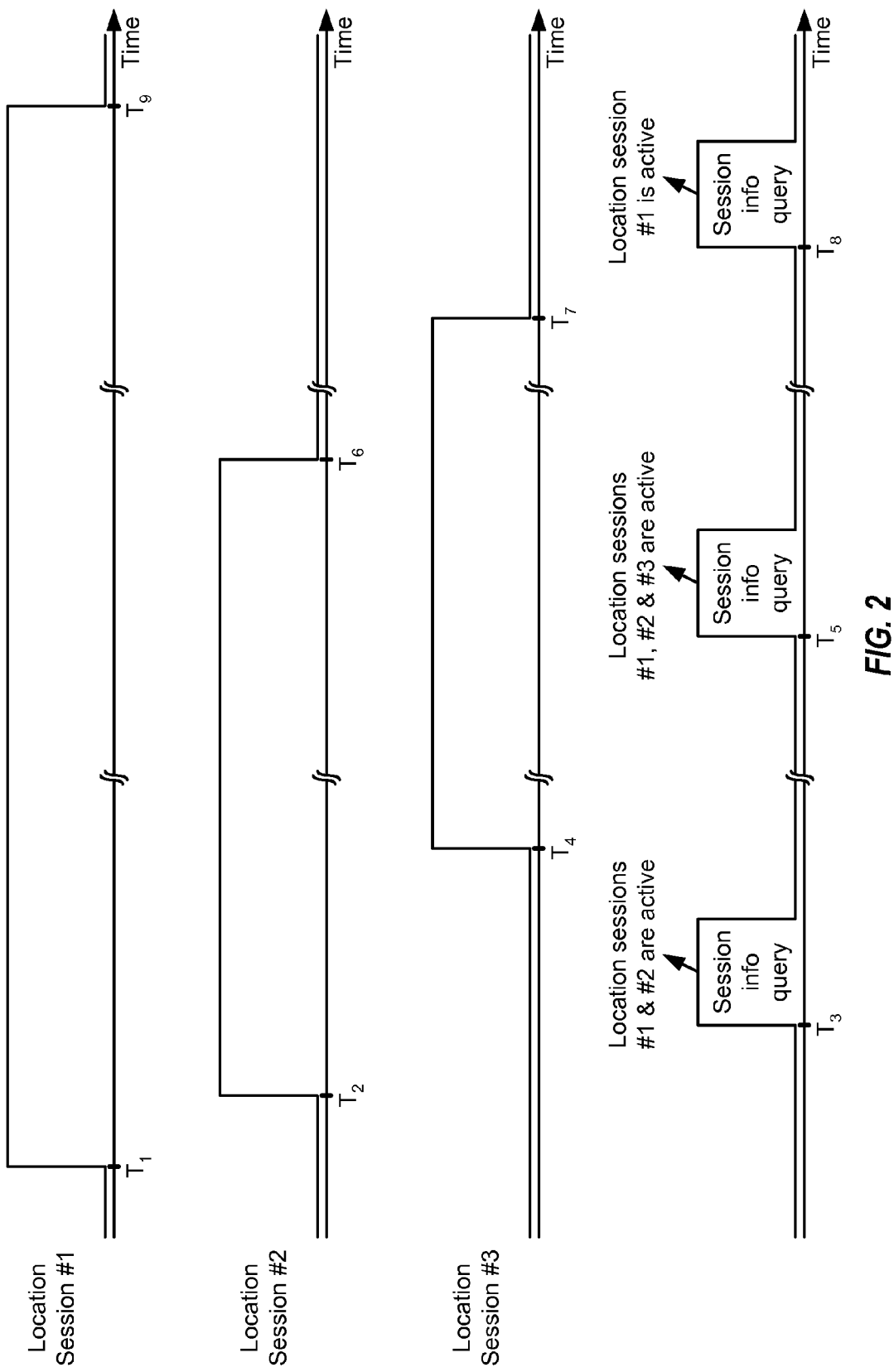
FIG. 2 shows use of session info query to obtain information on active location sessions.

FIG. 2 shows use of session info query to obtain information on active location sessions. In the following description, location session #x refers to a location session with a session ID of x. In the example shown in FIG. 2, SET 120 or SLP 130 may start location session #1 at time $T_1$. At a later time $T_2$, SET 120 or SLP 130 may start location session #2. At time $T_3$, SLP 130 may perform session info query to obtain information on the active location sessions for SET 120. SET 120 may respond with information indicating that location sessions #1 and #2 are active. At time $T_4$, SET 120 or SLP 130 may start location session #3. At time $T_5$, SLP 130 may perform session info query to obtain information on the active location sessions for SET 120. SET 120 may respond with information indicating that location sessions #1, #2 and #3 are active.

At time $T_6$, location session #2 may be terminated by SET 120 or SLP 130. At time $T_7$, location session #3 may be terminated by SET 120 or SLP 130. At time $T_8$, SLP 130 may perform session info query to obtain information on the active location sessions for SET 120. SET 120 may respond with information indicating that only location session #1 is active. At time $T_9$, location session #1 may be terminated by SET 120 or SLP 130.

In general, SLP 130 may perform session info query at any time to obtain information on the active location sessions for SET 120. Each session info query may be performed via a session that may be initiated by SLP 130 with a query message and terminated by SET 120 with a response message containing information on the active location sessions.

Figure 3:
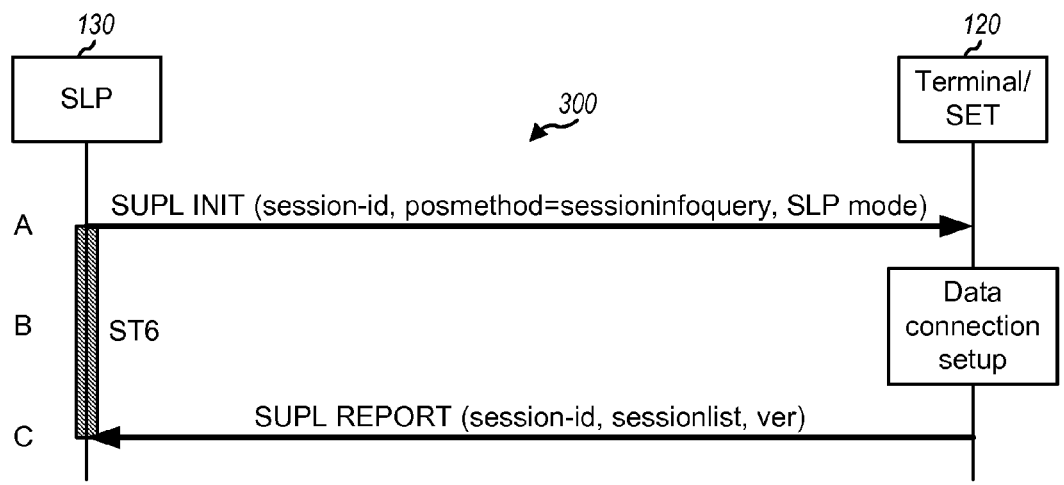
FIG. 3 shows a call flow for a session info query session.

FIG. 3 shows a design of a call flow 300 for a "query for session info" session (or simply, a session info query session) in SUPL. Call flow 300 may enable SLP 130 to query SET 120 for information on active location sessions. SLP 130 may initiate a session info query session by sending a SUPL INIT message to SET 120 (step A). The SUPL INIT message may include a session ID (session-id) for the session info query session, a positioning method (posmethod), and an SLP mode. The positioning method parameter normally indicates an intended positioning method for a location session. In one design, the session info query session may be indicated by setting the positioning method parameter to a predefined value of "sessioninfoquery". SLP 130 may compute and store a hash of the SUPL INIT message before sending the message to SET 120.

SET 120 may receive the SUPL INIT message from SLP 130 and may analyze the received message. SET 120 may take no further actions if the message is found to be non-authentic. Otherwise, SET 120 may perform a data connection setup procedure, attach itself to a packet data network if SET 120 is not already attached, and establish a secure connection to SLP 130 (step B). SET 120 may then return a SUPL REPORT message to SLP 130 (step C). The SUPL REPORT message may include a session ID for the session info query session, a list of session IDs (sessionlist) of all currently active location sessions between SET 120 and SLP 130, a hash of the received SUPL INIT message (ver), etc. SET 120 may also send its capabilities in the SUPL REPORT message (not shown in FIG. 3). SET 120 may release all resources related to the session info query session after sending the SUPL REPORT message.

SLP 130 may receive the SUPL REPORT message from SET 120 and may obtain the list of session IDs for the active location sessions known to SET 120. SLP 130 may then update its internal session ID context and identify "half open" location sessions based on the information received from SET 120. A half open location session is a location session that is considered active by only one entity and/or has parameters at the location server that are inconsistent with parameters at the SET. SLP 130 may decide to re-establish or close half open location sessions, e.g., re-establish location sessions which SLP 130 considered active but which SET 120 did not, or close location sessions that SET 120 considered active but which SLP 130 did not. If the SUPL REPORT message includes the SET capabilities, then SLP 130 may update any records maintained by SLP 130 for the SET capabilities.

SLP 130 may start a timer ST6 upon sending the SUPL INIT message in step A. This timer may be set to a suitable value, e.g., 10 seconds or some other duration. SLP 130 may clear resources at the SLP for the session info query session if a SUPL REPORT message is not received from SET 120 when the timer expires. In one design, SLP 130 may also assume that SET 120 is down (e.g., powered off or without communication access) if a SUPL REPORT message is not received prior to expiration of the timer and may also clear resources for location sessions that SLP 130 considered active for SET 120. In another design, SLP 130 may attempt sending the SUPL INIT message several times before deciding that SET 120 is down. SLP 130 may also perform other actions if a SUPL REPORT message is not received prior to expiration of the timer.

In the design shown in FIG. 3, a SUPL INIT message with the positioning method parameter set to "sessioninfoquery" is used as a query message to request for information on active location sessions. A SUPL REPORT message is used as a response message carrying the information on the active location sessions. Other SUPL messages may also be used for the query message and the response message.

In general, SET 120 may return any pertinent information in a response message. In one design, SET 120 may return only a list of session IDs for all active location sessions. In another design, SET 120 may return additional information regarding each active location session such as the type of location session (e.g., periodic triggered session or area event triggered session), session-specific parameters, the SET capabilities, etc. The session-specific parameters may comprise the overall duration and the periodic interval for a periodic triggered session, the target geographic area(s) and event trigger types for an area event triggered session, etc.

For each session info query, SLP 130 may compare the information received from SET 120 with the information stored at SLP 130. If the received information is consistent with the stored information, then SLP 130 may assume that there is synchronization between itself and SET 120 regarding the active location sessions. If the received information is inconsistent with the stored information, then SLP 130 may perform corrective actions. The actions to be taken by SLP 130 may be dependent on the type of information received from SET 120. In one design, SET 120 may return only a list of session IDs for the active location sessions. In this case, SLP 130 may verify if SET 120 recognizes the same location sessions as SLP 130 and may assume that the session parameters are correct for each location session that SLP 120 and SET 130 both recognize. If one entity (e.g., SET 120 or SLP 130) records a location session that the other entity does not have, then SLP 130 may terminate the location session, e.g., by informing SET 120 if the SET indicated that the location session is active. In another design, SET 120 may return a list of session IDs as well as session-specific parameters for the active location sessions. In this case, if certain parameters for a given location session are not in agreement at SET 120 and SLP 130, then SLP 130 may restart the location session with SET 120 using the correct parameters.

SLP 130 may determine whether to perform session info query and when to perform session info query based on various factors such as the location service types for the active location sessions. In one design, SLP 130 may perform session info query if location information is not received from SET 120 within an expected reporting interval for a periodic triggered session. In one design, SLP 130 may periodically perform session info query when an area event triggered session is active. SLP 130 may also perform session info query whenever it suspects that SET 120 or SLP 130 might have lost session information. For example, SLP 130 may suspect that SLP 130 has lost location information if it receives a SUPL message from SET 120 for a SUPL session unknown to SLP 130. SLP 130 may also perform session info query for regular maintenance to clear old location sessions that may no longer be valid.

Session info query may be performed whenever SLP 130 suspects that one or more active location sessions may be half open. Session info query may be especially useful when an area event triggered session is in progress since (i) the session may be active for an extended period of time and (ii) SET 120 may send location information in an unpredictable manner, which may make it more difficult to detect error conditions.

Figure 4:
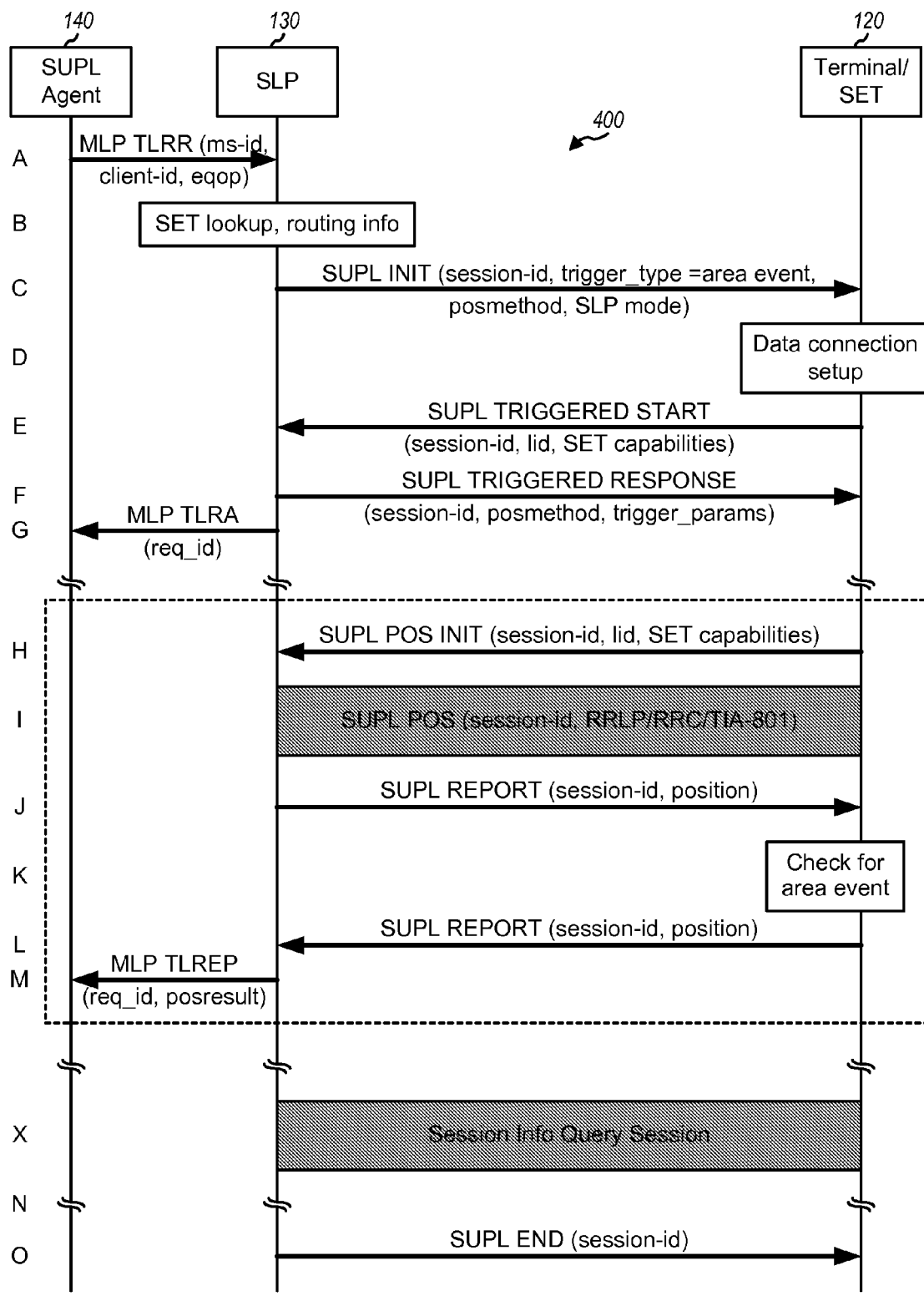
FIG. 4 shows a call flow for network-initiated area event triggered service.

FIG. 4 shows a design of a call flow 400 for network-initiated area event triggered service. SUPL agent 140 may desire location information for SET 120 and may send a Mobile Location Protocol (MLP) Triggered Location Reporting Request (TLRR) message to SLP 130 (step A). SLP 130 may authenticate and authorize SUPL agent 140 for the requested location information. SLP 130 may then obtain routing information for SET 120 (step B). SLP 130 may send a SUPL INIT message to initiate an area event triggered session with SET 120 (step C). The SUPL INIT message may include a session ID for the area event triggered session (session-id), a trigger type indicator (trigger_type) that indicates area event trigger, an intended positioning method (pos-method), an SLP mode, etc.

SET 120 may receive the SUPL INIT message, perform a data connection setup procedure, attach itself to a packet data network, and establish a secure connection to SLP 130 (step D). SET 120 may then send a SUPL TRIGGERED START message to start the area event triggered session (step E). The SUPL TRIGGERED START message may include the session-id, a location-id (lid) identifying the current serving cell of SET 120, the SET capabilities, etc.

SLP 130 may receive the SUPL TRIGGERED START message from SET 120 and may store the SET capabilities for future use. SLP 130 may return to SET 120 a SUPL TRIGGERED RESPONSE message containing the session-id, the selected positioning method, area event parameters (trigger_params), etc. (step F). SLP 130 may also send an MLP Triggered Location Reporting Answer (TLRA) message to SUPL agent 140 to indicate that the triggered location request has been accepted (step G). The MLP TLRA message may include a request-id (req-id) to be used as a transaction ID for the area event triggered session.

The area event parameters sent in step F may include one or more area events. An area event may be defined by SET 120 being inside a predefined area, being outside the predefined area, entering the predefined area, leaving the predefined area, etc. An area event may be dependent on the SET location and may be triggered at any time, if at all. When an area event trigger mechanism in SET 120 indicates that a position fix is to be computed, SET 120 may send a SUPL POS INIT message to start a positioning session with SLP 130 (step H). The SUPL POS INIT message may include the session-id, the SET capabilities, etc. SLP 130 and SET 120 may exchange messages for the positioning session (step I), and SLP 130 may send a SUPL REPORT message containing a position estimate to SET 120 (step J). Alternatively, SET 120 may obtain a position estimate itself (e.g., with the help of assistance data sent by SLP 130 in step I) without the need for SLP 130 to provide this in step J. SET 120 may then check the position estimate to determine whether an area event trigger condition has been met (step K). If an area event is triggered, then SET 120 may send a SUPL REPORT message containing the position estimate to SLP 130 (step L). SLP 130 may then forward the position estimate in an MLP Triggered Location Report (TLREP) message to SUPL agent 140 (step M).

At any time during the area event triggered session (e.g., after an idle period when SLP 130 suspects that the area event triggered session may be half open), SLP 130 may initiate a session info query session (step X). This session info query session may be independent of the area event triggered session and may be assigned a separate session ID. The session info query session may occur at any time during the area event triggered session and may be concurrent with the area event triggered session. The session info query session in step X may be implemented with call flow 300 in FIG. 3. Any number of session info query sessions may be performed during the area event triggered session.

Steps H to M may be repeated as applicable. When the last report has been sent for the area event triggered session, SLP 130 may send a SUPL END message to SET 120 to end the area event triggered session (step O).

SLP 130 may perform session info query to obtain information on active location sessions, as described above. SLP 130 may also perform session info query to obtain information on capabilities of SET 120. The SET capabilities may be conveyed by one or more classmarks or in some other form. SLP 130 may explicitly query for the SET capabilities, e.g., by using a predefined parameter value in a SUPL INIT message sent to SET 120. SET 120 may return its capabilities when explicitly requested by SLP 130 and/or when decided by SET 120, e.g., due to changes in the SET capabilities. In any case, SLP 130 may maintain a record of the SET capabilities and may update this record whenever information on the SET capabilities is received from SET 120. This may be useful in case the SET capabilities are changed by a user using a menu function, a change in physical SET device, etc. For example, the user may change the physical SET device but may keep the same SET identity by removing a Universal Subscriber Identity Module (USIM), a Subscriber Identity Module (SIM), or a Universal Integrated Circuit Card (UICC) from one SET device and placing it in another SET device having different capabilities.

In the design shown in FIG. 3, a session info query session may be identified by a predefined value for the positioning method parameter, which may be included in a SUPL INIT message (as shown in FIG. 3) or some other SUPL message. Table 2 shows a design of the positioning method parameter to support session info query. A session info query session may also be identified in other manners.

TABLE 2

Positioning Method Parameter

| Parameter | Presence | Value/Description |
|---|---|---|
| Position Method | | Describes the positioning method: Assisted GPS (A-GPS) SET assisted only A-GPS SET based only A-GPS SET assisted preferred (A-GPS SET based is the fallback mode) A-GPS SET based preferred (A-GPS SET assisted is the fallback mode) A-GNSS SET assisted only A-GNSS SET based only A-GNSS SET assisted preferred (A-GNSS SET based is the fallback mode) A-GNSS SET based preferred (A-GNSS SET assisted is the fallback mode) Autonomous GPS Autonomous GNSS |

TABLE 2-continued

Positioning Method Parameter

| Parameter | Presence | Value/Description |
|---|---|---|
| | | Advanced Forward Link Trilateration (AFLT) Enhanced Cell/Sector Enhanced Observed Time Difference (EOTD) Observed Time Difference Of Arrival (OTDOA) No position Historical Data Retrieval Session-Info Query Session-Info Query is used to retrieve the session-ids of all active SUPL sessions at the SET and optionally also the SET Capabilities. No position fix is calculated during a "Session-Info Query" session. |

Figure 5:
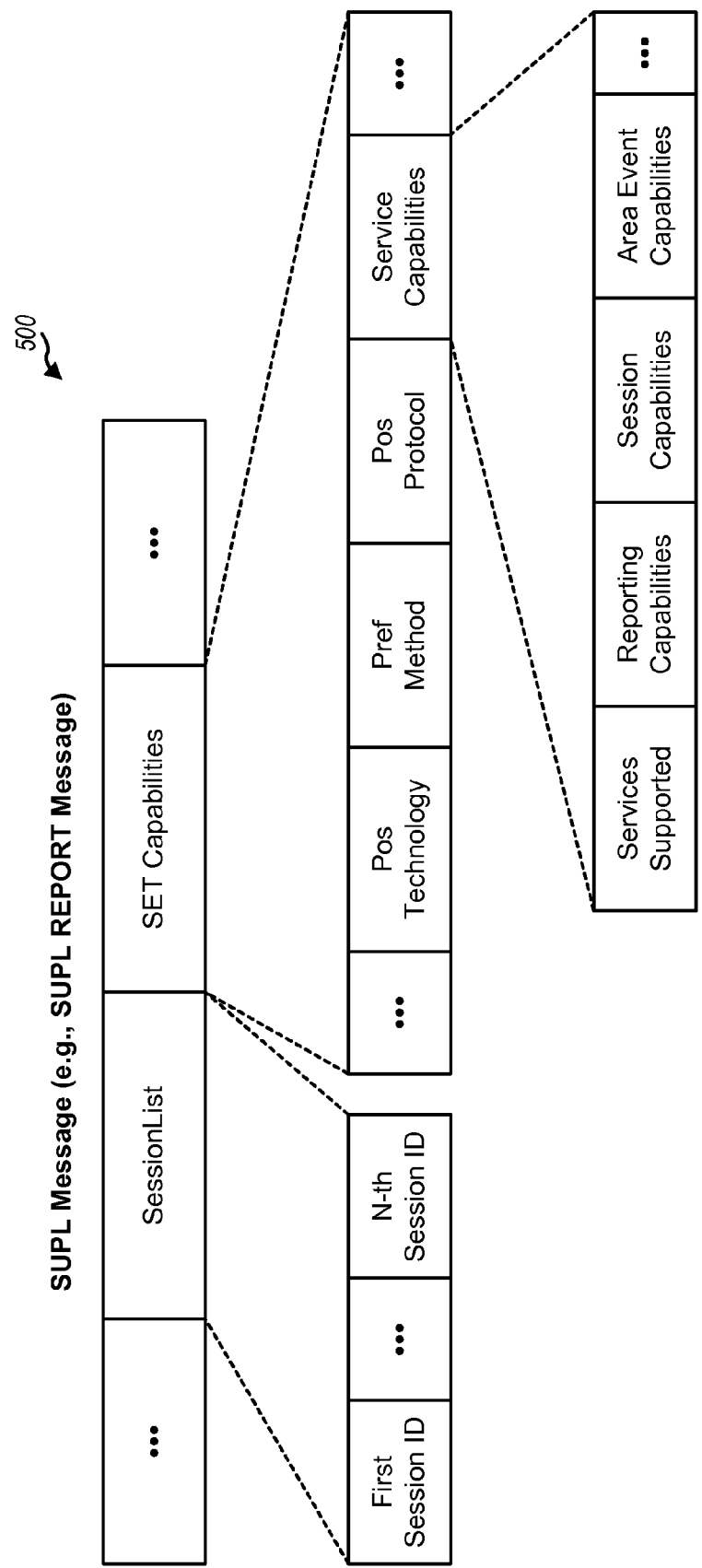
FIG. 5 shows a message for sending information on active location sessions.

FIG. 5 shows a design of a SUPL message 500 (e.g., a SUPL REPORT message) for sending information for SET 120. In this design, SUPL message 500 includes a SessionList parameter, a SET Capabilities parameter, and possibly other parameters not shown in FIG. 5 for simplicity. The SessionList parameter may include N session IDs for N active location sessions, where N may be equal to zero or larger.

The SET Capabilities parameter may include a Pos Technology parameter, a Pref Method parameter, a Pos Protocol parameter, a Service Capabilities parameter, and possibly other parameters not shown in FIG. 5 for simplicity. The Pos Technology parameter may identify zero or more positioning methods supported by SET 120. The Pref Method parameter may identify a positioning method preferred by SET 120. The Pos Protocol parameter may identify zero or more positioning protocols supported by SET 120, e.g., RRLP, RRC, TIA-801, etc.

The Service Capabilities parameter may include a Services Supported parameter, a Reporting Capabilities parameter, a Session Capabilities parameter, an Area Event Capabilities parameter, and possibly other parameters not shown in FIG. 5 for simplicity. The Services Supported parameter may define location services supported by SET 120, e.g., periodic trigger, area event trigger, etc. The Reporting Capabilities parameter may define reporting capabilities of SET 120. The Session Capabilities parameter may define session capabilities of SET 120, e.g., the maximum number of periodic triggered sessions, the maximum number of area event triggered sessions, and the total number of simultaneous location sessions supported by SET 120. The Area Event Capabilities parameter may define the area event capabilities of SET 120.

Table 3 shows a design of the SUPL REPORT message, which may be used by SET 120 in response to a session info query from SLP 130. In Table 3, the "O" in the presence column indicates an optional parameter. The SUPL REPORT message may include a list of session IDs of all active location sessions. The SUPL REPORT message may also include the SET capabilities and/or other parameters not shown in Table 3 for simplicity but described in the aforementioned OMA-TS-ULP-V2 document. The SUPL REPORT message may also be used for other purposes, e.g., by SLP 130 to indicate the end of a positioning procedure, by SET 120 to send measurement(s) to SLP 130 during a triggered session, by SLP 130 to send position result(s) to SET 120 during a triggered session, etc.

TABLE 3

SUPL REPORT Message

| Parameter | Presence | Value/Description |
|---|---|---|
| SessionList | O | A list of the session-ids of all active SUPL sessions. The list does not contain the session-id of the "session-info query" session which is already included in the session-id parameter of the SUPL REPORT message. |
| SET capabilities | O | Defines the capabilities of the SET. This parameter may only be used if the SUPL REPORT message is sent in the context of a "session-info query" session. |
| . | . | . |
| . | . | . |
| . | . | . |

In another aspect, SET 120 may perform session info update when a location session of an extended duration may still be in progress with SLP 130. For the session info update, SET 120 may send information on active location sessions and/or information on capabilities of SET 120. The information on the active location sessions may include a list of session IDs, the location service types for the active location sessions, session-specific parameters, etc.

In one design, SET 120 may send an update message to SLP 130 to ensure that location related information in SET 120 remains consistent with location related information in SLP 130. SET 120 may send an update message (i) when the SET capabilities change, (ii) when SET 120 is engaged in a location session for which no messages have been exchanged with SLP 130 for a period of T or more, or (iii) when some other condition is met. T may be set to a suitable value to obtain the desired update rate. For example, T may be provided by SLP 130 to SET 120 or may be set to a default value in SET 120. T may also be set to a reserved value (e.g., all ones) by SLP 130 to stop SET 120 from sending update messages due to condition (ii), so that SLP 130 can avoid receiving the update messages from SET 120.

SLP 130 may receive an update message from SET 120 at a maximum interval of T when there is at least one active location session in SET 120, provided that SET 120 has connectivity. SLP 130 may then determine which SUPL sessions are half open as described above and may either terminate or restart these sessions. If SLP 130 has not received an update message for a period longer than T, then SLP 130 may perform session info query or may end all active location sessions with SET 120 by sending a SUPL END message for each active location session known to SLP 130. SLP 130 may also send a SUPL message (e.g., a SUPL END message) to SET 120 to terminate all active sessions known to SET 120 including sessions active in SET 120 but not active in SLP 130. If SLP 130 is unable to send the SUPL END message to SET 120, then SLP 130 may assume that SET 120 has no connectivity or is powered off. SLP 130 may wait for an additional interval (e.g., an interval of T) and, if nothing was received from SET 120 during this interval, may again attempt to end each active location session.

In one design, SET 120 may initiate a session info update session by sending a SUPL UPDATE message to SLP 130. The SUPL UPDATE message may be sent without having an active session whereas a SUPL REPORT message may be sent during an active session. SET 120 may provide information on active location sessions and/or information on SET capabilities in the SUPL UPDATE message. SLP 130 may terminate the session info update session by sending a SUPL END message to SET 120. A session info update session may also be implemented with other message sequences.

FIG. 6 shows a design of a process 600 performed by a location server (e.g., an SLP) to support location services. The location server may send a query message to a terminal to query for information on active location sessions (block 612). The location server may receive from the terminal a response message comprising the information on the active location sessions (block 614). In one design, the query message may be a SUPL INIT message comprising a positioning method parameter set to a predefined value to indicate a session info query session. In one design, the response message may be a SUPL REPORT message containing the information on the active location sessions. The query message and the response message may also be other messages in SUPL or some other location architecture. The information on the active location sessions may comprise a list of session IDs for the active location sessions, parameters for the active location sessions, capabilities of the terminal, and/or other information.

The location server may send the query message when it suspects that at least one location session for periodic triggered service or area event triggered service is active. In one design, the location server may send the query message if location information is not received from the terminal within an expected reporting interval for an active location session for periodic triggered service. In another design, the location server may periodically send the query message if there is an active location session for area event triggered service. In yet another design, the location server may send the query message if location information is received from the terminal for a location session unknown to the location server. The location server may also send the query message for other reasons. The location server may send the query message for a session info query session and may start a timer upon sending the query message. The location server may terminate the session info query session if a response message is not received from the terminal prior to expiration of the timer.

The location server may terminate a location session deemed to be active at only the terminal or only the location server and may identify this location session based on the received information in the response message and information stored at the location server (block 616). The location server may restart or terminate a location session having inconsistent parameters at the terminal and the location server and may identify this location session based on the received information and the stored information (block 618).

FIG. 7 shows a design of a process 700 performed by a terminal (e.g., a SET) to support location services. The terminal may receive a query message from a location server to query for information on active location sessions (block 712). The terminal may receive the query message, e.g., when at least one location session for periodic triggered service or area event triggered service is suspected to be active by the location server. The terminal may send to the location server a response message comprising the information on the active location sessions (block 714). In one design, the query message may be a SUPL INIT message comprising a positioning method parameter set to a predefined value to indicate a session info query session. In one design, the response message may be a SUPL REPORT message containing the information on the active location sessions. The information on the active location sessions may comprise a list of session IDs for the active location sessions, parameters for the active location sessions, capabilities of the terminal, and/or other information. The terminal may send the information on the capabilities of the terminal if requested by the location server, if the capabilities have changed since they were last reported to the location server, etc.

The terminal may thereafter receive a message from the location server to terminate a location session deemed to be active at the terminal but not at the location server and identified based on the information in the response message (block 716). The terminal may receive a message from the location server to restart or terminate a location session having inconsistent parameters at the terminal and the location server and identified based on the information in the response message (block 718). The terminal may clear all location sessions terminated by the location server and may reset each location session restarted by the location server.

FIG. 8 shows a design of a process 800 performed by a terminal (e.g., a SET) to support location services. The terminal may generate an update message comprising location related information for a terminal (block 812). The terminal may send the update message to a location server to update the location server with the location related information for the terminal (block 814). The terminal may send the update message for a session info update session initiated by the terminal. In one design, the location related information for the terminal may comprise information on active location sessions. The terminal may send the update message if no messages have been exchanged with the location server within a predetermined time period for an active location session. The terminal may periodically send the update message unless instructed otherwise by the location server. In another design, the location related information for the terminal may comprise information on capabilities of the terminal. The terminal may send the update message if the capabilities of the terminal have changed since they were last reported to the location server.

FIG. 9 shows a design of a process 900 performed by a location server (e.g., an SLP) to support location services. The location server may receive an update message comprising location related information for a terminal, with the update message being received from the terminal without solicitation from the location server (block 912). The location related information for the terminal may comprise information on active location sessions, information on capabilities of the terminal, etc. The location server may update location related information for the terminal at the location server with the location related information in the update message (block 914). The location server may periodically receive the update message from the terminal. The location server may also instruct the terminal to stop sending the update message.

Figure 10:
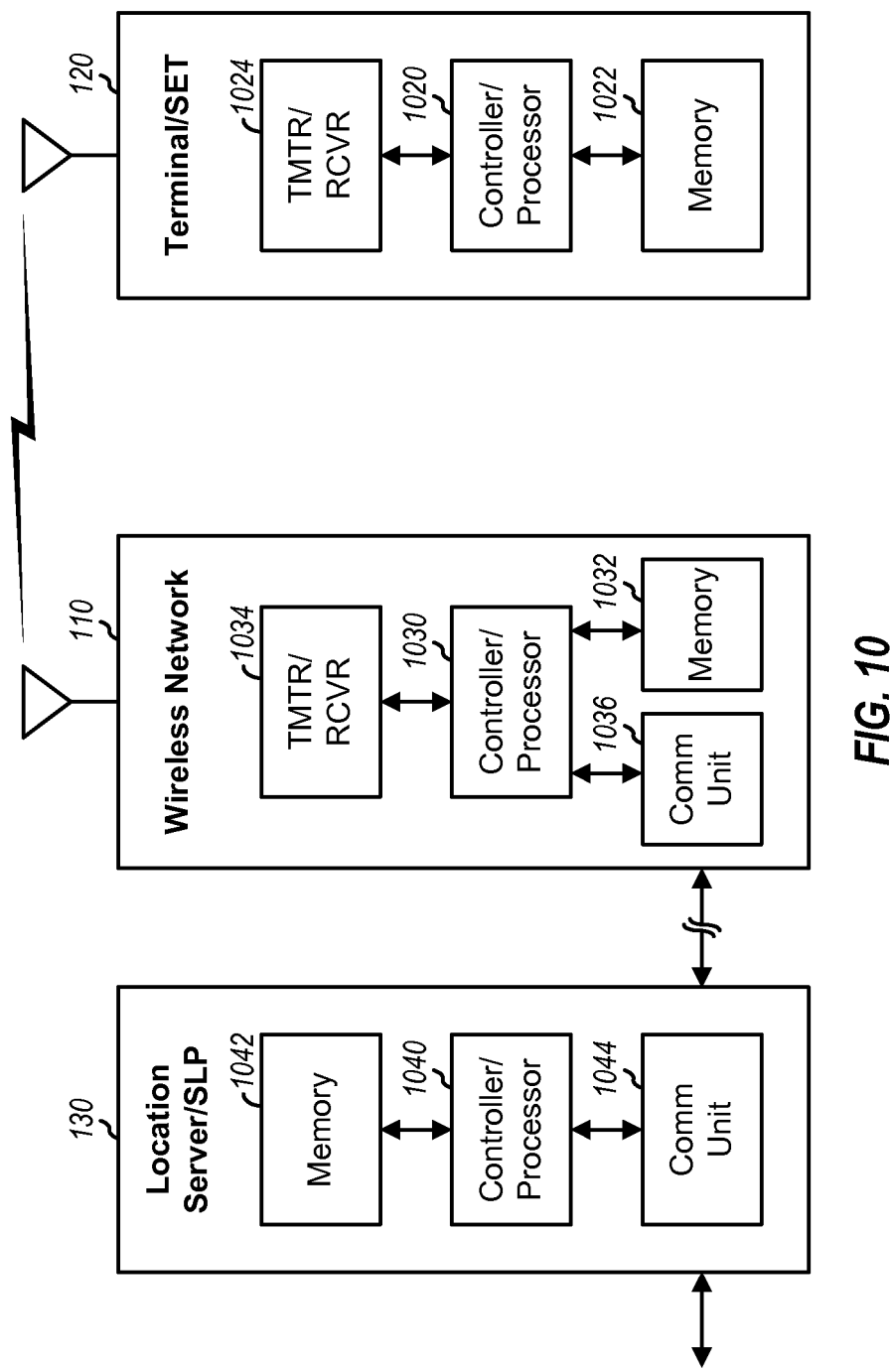
FIG. 10 shows a block diagram of the terminal and the location server.

FIG. 10 shows a block diagram of a design of wireless network 110, terminal/SET 120, and location server/SLP 130 in FIG. 1. For simplicity, FIG. 10 shows only one controller/processor 1020, one memory 1022, and one transmitter/receiver (TMTR/RCVR) 1024 for terminal 120, only one controller/processor 1030, one memory 1032, one transmitter/receiver 1034, and one communication (Comm) unit 1036 for wireless network 110, and only one controller/processor 1040, one memory 1042, and one communication unit 1044 for SLP 130. In general, each entity may include any number of processors, controllers, memories, transmitters/receivers, communication units, etc. Terminal 120 may support communication with one or more wireless and/or wireline networks. Terminal 120 may also receive and process signals from one or more satellite positioning systems, e.g., GPS, Galileo, etc.

On the downlink, wireless network 110 may transmit traffic data, signaling, and pilot to terminals within its coverage area. These various types of information may be processed by processor 1030, conditioned by transmitter 1034, and transmitted on the downlink. At terminal 120, downlink signals from wireless network 110 may be received and conditioned by receiver 1024 and further processed by processor 1020 to obtain various types of information. Processor 1020 may perform process 700 in FIG. 7, process 800 in FIG. 8, and/or other processes for the techniques described herein. Memories 1022 and 1032 may store program codes and data for terminal 120 and wireless network 110, respectively. On the uplink, terminal 120 may transmit traffic data, signaling, and pilot to wireless network 110. These various types of information may be processed by processor 1020, conditioned by transmitter 1024, and transmitted on the uplink. At wireless network 110, the uplink signals from terminal 120 and other terminals may be received and conditioned by receiver 1034 and further processed by processor 1030 to obtain various types of information from the terminals. Wireless network 110 may directly or indirectly communicate with SLP 130 via communication unit 1036.

Within SLP 130, processor 1040 may perform processing to support location services for terminals. For example, processor 1040 may perform process 600 in FIG. 6, process 900 in FIG. 9, and/or other processes for the techniques described herein. Processor 1040 may also compute position estimates for terminal 120, provide location information to SUPL agent 140, etc. Memory 1042 may store program codes and data for SLP 130. Communication unit 1044 may allow SLP 130 to communicate with wireless network 110, terminal 120, and/or other network entities. SLP 130 and terminal 120 may exchange messages via a user plane (e.g., SUPL), and these messages may be transported by wireless network 110 and/or wireline network 112.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of supporting location services, comprising:
sending a query message from a location server to a terminal to query for a list of active location sessions currently in progress, wherein the sending the query message comprises sending a Secure User Plane Location (SUPL) INIT message comprising a positioning method parameter set to a predefined value to indicate a session info query session;
receiving from the terminal a response message comprising the list of active location sessions, wherein the receiving the response message comprises receiving a SUPL REPORT message comprising the list of the active location sessions, and wherein the list of the active location sessions received from the terminal comprises an indication of at least two active location sessions identified by the terminal as being currently in progress between the terminal and the location server; and
terminating an active location session based at least in part on the list in the response message.

2. The method of claim 1, wherein the list of the active location sessions comprises a list of session identifiers (IDs) for the active location sessions.

3. The method of claim 1, wherein the response message further comprises parameters for the active location sessions.

4. The method of claim 1, wherein the response message further comprises information on capabilities of the terminal.

5. The method of claim 1, wherein the sending the query message comprises sending the query message when at least one location session for periodic triggered service or area event triggered service is suspected to be active by the location server.

6. The method of claim 1, wherein the sending the query message comprises sending the query message if location information is not received from the terminal within an expected reporting interval for an active location session for periodic triggered service.

7. The method of claim 1, further comprising:
identifying the active location session as active at only the terminal or only the location server based on the list in the response message and information stored at the location server; and
terminating the active location session in response to identifying the active location session as active at only the terminal or only the location server.

8. The method of claim 1, further comprising:
identifying the active location session as having inconsistent parameters at the terminal and the location server based on the list in the response message and information stored at the location server; and
terminating the active location session in response to identifying the active location session as having inconsistent parameters at the terminal and the location server based on the list in the response message and information stored at the location server.

9. The method of claim 1, further comprising:
starting a timer upon sending the query message for a session info query session; and
terminating the session info query session if a response message is not received from the terminal prior to expiration of the timer.

10. An apparatus for supporting location services, comprising:
means for sending a query message from a location server to a terminal to query for a list of active location sessions currently in progress, wherein the sending the query message comprises sending a Secure User Plane Location (SUPL) INIT message comprising a positioning method parameter set to a predefined value to indicate a session info query session;
means for receiving from the terminal a response message comprising the list of active location sessions, wherein the receiving the response message comprises receiving a SUPL REPORT message comprising the list of the active location sessions, and wherein the list of the active location sessions received from the terminal comprises an indication of at least two active location sessions identified by the terminal as being currently in progress between the terminal and the location server; and means for terminating an active location session based at least in part on the list in the response message.

11. The apparatus of claim 10, wherein the means for sending the query message comprises means for sending a Secure User Plane Location (SUPL) INIT message comprising a positioning method parameter set to a predefined value to indicate a session info query session, and wherein the means for receiving the response message comprises means for receiving a SUPL REPORT message comprising the list of the active location sessions.

12. The apparatus of claim 10, wherein the list of the active location sessions comprises a list of session identifiers (IDs) for the active location sessions.

13. The apparatus of claim 10, wherein the response message further comprises information on capabilities of the terminal.

14. The apparatus of claim 10, wherein the means for sending the query message comprises means for sending the query message when at least one location session for periodic triggered service or area event triggered service is suspected to be active by the location server.

15. The apparatus of claim 10, further comprising:
means for identifying the active location session as active at only the terminal or only the location server based on the list in the response message and information stored at the location server; and
means for terminating the active location session in response to identifying the active location session as active at only the terminal or only the location server.

16. An apparatus for supporting location services, comprising:
at least one processor configured
to send a query message from a location server to a terminal to query for a list of active location sessions currently in progress, wherein the sending the query message comprises sending a Secure User Plane Location (SUPL) INIT message comprising a positioning method parameter set to a predefined value to indicate a session info query session;
to receive from the terminal a response message comprising the list of active location sessions, wherein the receiving the response message comprises receiving a SUPL REPORT message comprising the list of the active location sessions, and wherein the list of the active location sessions received from the terminal comprises an indication of at least two active location sessions identified by the terminal as being currently in progress between the terminal and the location server; and
to terminate an active location session based at least in part on the list in the response message.

17. The apparatus of claim 16, wherein the at least one processor is configured to send as the query message a Secure User Plane Location (SUPL) INIT message comprising a positioning method parameter set to a predefined value to indicate a session info query session, and to receive as the response message a SUPL REPORT message comprising the list of the active location sessions.

18. The apparatus of claim 16, wherein the at least one processor is configured to obtain a list of session identifiers (IDs) for the active location sessions from the list of the active location sessions.

19. The apparatus of claim 16, wherein the at least one processor is further configured to receive information on capabilities of the terminal from the response message.

20. The apparatus of claim 16, wherein the at least one processor is configured to send the query message when at least one location session for periodic triggered service or area event triggered service is suspected to be active by the location server.

21. The apparatus of claim 16, wherein the at least one processor is configured to identify the active location session as active at only the terminal or only the location server based on the list in the response message and information stored at the location server, and to terminate the active location session in response to identifying the active location session as active at only the terminal or only the location server.

22. A non-transitory computer-readable medium comprising code, which, when executed by a processor, causes the processor to perform operations for supporting location services, the computer-readable medium comprising:
code for causing at least one computer to send a query message from a location server to a terminal to query for a list of active location sessions currently in progress, wherein the sending the query message comprises sending a Secure User Plane Location (SUPL) INIT message comprising a positioning method parameter set to a predefined value to indicate a session info query session;
code for causing the at least one computer to receive from the terminal a response message comprising the list of active location sessions, wherein the receiving the response message comprises receiving a SUPL REPORT message comprising the list of the active location sessions, and wherein the list of the active location sessions received from the terminal comprises an indication of at least two active location sessions identified by the terminal as being currently in progress between the terminal and the location server; and
code for causing the at least one computer to terminate an active location session based at least in part on the list in the response message.

23. A method of supporting location services, comprising:
receiving a query message sent from a location server to a terminal to query for a list of active location sessions currently in progress, wherein the receiving the query message comprises receiving a Secure User Plane Location (SUPL) INIT message comprising a positioning method parameter set to a predefined value to indicate a session info query session;
sending to the location server a response message comprising the list of active location sessions, wherein the sending the response message comprises sending a SUPL REPORT message comprising the list of the active location sessions, and wherein the list of the active location sessions sent from the terminal comprises an indication of at least two active location sessions identified by the terminal as being currently in progress between the terminal and the location server; and
receiving a termination message from the location server to terminate an active location session based at least in part on the list in the response message.

24. The method of claim 23, wherein the receiving the query message comprises receiving a Secure User Plane Location (SUPL) INIT message comprising a positioning method parameter set to a predefined value to indicate a session info query session, and wherein the sending the response message comprises sending a SUPL REPORT message comprising the list of the active location sessions.

25. The method of claim 23, wherein the list of the active location sessions comprises a list of session identifiers (IDs) for the active location sessions.

26. The method of claim 23, wherein the response message further comprises information on capabilities of the terminal.

27. The method of claim 23, wherein the receiving the query message comprises receiving the query message when at least one location session for periodic triggered service or area event triggered service is suspected to be active by the location server.

28. The method of claim 23, further comprising:
receiving a termination message from the location server to terminate the active location session in response to the active location session being identified as active at the terminal but not at the location server, the location session being identified based on the list in the response message.

29. The method of claim 23, further comprising:
receiving a termination message from the location server to terminate the active location session in response to the active location session being identified as having inconsistent parameters at the terminal and the location server based on the list in the response message.

30. An apparatus for supporting location services, comprising:
at least one processor configured to:
receive a query message sent from a location server to a terminal to query for a list of active location sessions currently in progress, wherein the receiving the query message comprises receiving a Secure User Plane Location (SUPL) INIT message comprising a positioning method parameter set to a predefined value to indicate a session info query session;
to send to the location server a response message comprising the list of active location sessions, wherein the sending the response message comprises sending a SUPL REPORT message comprising the list of the active location sessions, and wherein the list of the active location sessions sent from the terminal comprises an indication of at least two active location sessions identified by the terminal as being currently in progress between the terminal and the location server; and
to receive a termination message from the location server to terminate an active location session based at least in part on the list in the response message.

31. The apparatus of claim 30, wherein the at least one processor is configured to receive as the query message a Secure User Plane Location (SUPL) INIT message comprising a positioning method parameter set to a predefined value to indicate a session info query session, and to send as the response message a SUPL REPORT message comprising the list of the active location sessions.

32. The apparatus of claim 30, wherein the list of the active location sessions comprises a list of session identifiers (IDs) for the active location sessions.

33. The apparatus of claim 30, wherein the response message further comprises information on capabilities of the terminal.

34. An apparatus for supporting location services, comprising:
means for receiving a query message sent from a location server to a terminal to query for a list of active location sessions currently in progress, wherein the receiving the query message comprises receiving a Secure User Plane Location (SUPL) INIT message comprising a positioning method parameter set to a predefined value to indicate a session info query session;
means for sending to the location server a response message comprising the list of active location sessions, wherein the sending the response message comprises sending a SUPL REPORT message comprising the list of the active location sessions, and wherein the list of the active location sessions sent from the terminal comprises an indication of at least two active location sessions identified by the terminal as being currently in progress between the terminal and the location server; and
means for receiving a termination message from the location server to terminate an active location session based at least in part on the list in the response message.

35. The apparatus of claim 34, wherein the means for receiving the query message comprises means for receiving a Secure User Plane Location (SUPL) INIT message comprising a positioning method parameter set to a predefined value to indicate a session info query session, and wherein the means for sending the response message comprises means for sending a SUPL REPORT message comprising the list of the active location sessions.

36. The apparatus of claim 34, further comprising:
means for receiving a termination message from the location server to terminate the active location session in response to the active location session being identified as active at the terminal but not at the location server, the location session being identified based on the list in the response message.

37. The apparatus of claim 34, wherein the list of the active location sessions comprises a list of session identifiers (IDs) for the active location sessions.

38. The apparatus of claim 34, wherein the response message further comprises information on capabilities of the terminal.

39. A non-transitory computer-readable medium comprising code, which, when executed by a processor, causes the processor to perform operations for supporting location services, the computer-readable medium comprising:
code for causing at least one computer to receive a query message sent from a location server to a terminal to query for a list of active location sessions currently in progress, wherein the receiving the query message comprises receiving a Secure User Plane Location (SUPL) INIT message comprising a positioning method parameter set to a predefined value to indicate a session info query session;
code for causing at least one computer to send to the location server a response message comprising the list of active location sessions, wherein the sending the response message comprises sending a SUPL REPORT message comprising the list of the active location sessions, and wherein the list of the active location sessions sent from the terminal comprises an indication of at least two active location sessions identified by the terminal as being currently in progress between the terminal and the location server; and
code for causing at least one computer to receive a termination message from the location server to terminate an active location session based at least in part on the list in the response message.

40. The method of claim 1 comprising:
restarting the active location session.

41. The method of claim 23 comprising:
receiving a restart message from the location server to restart the active location session.

* * * * *